Patented Aug. 18, 1931

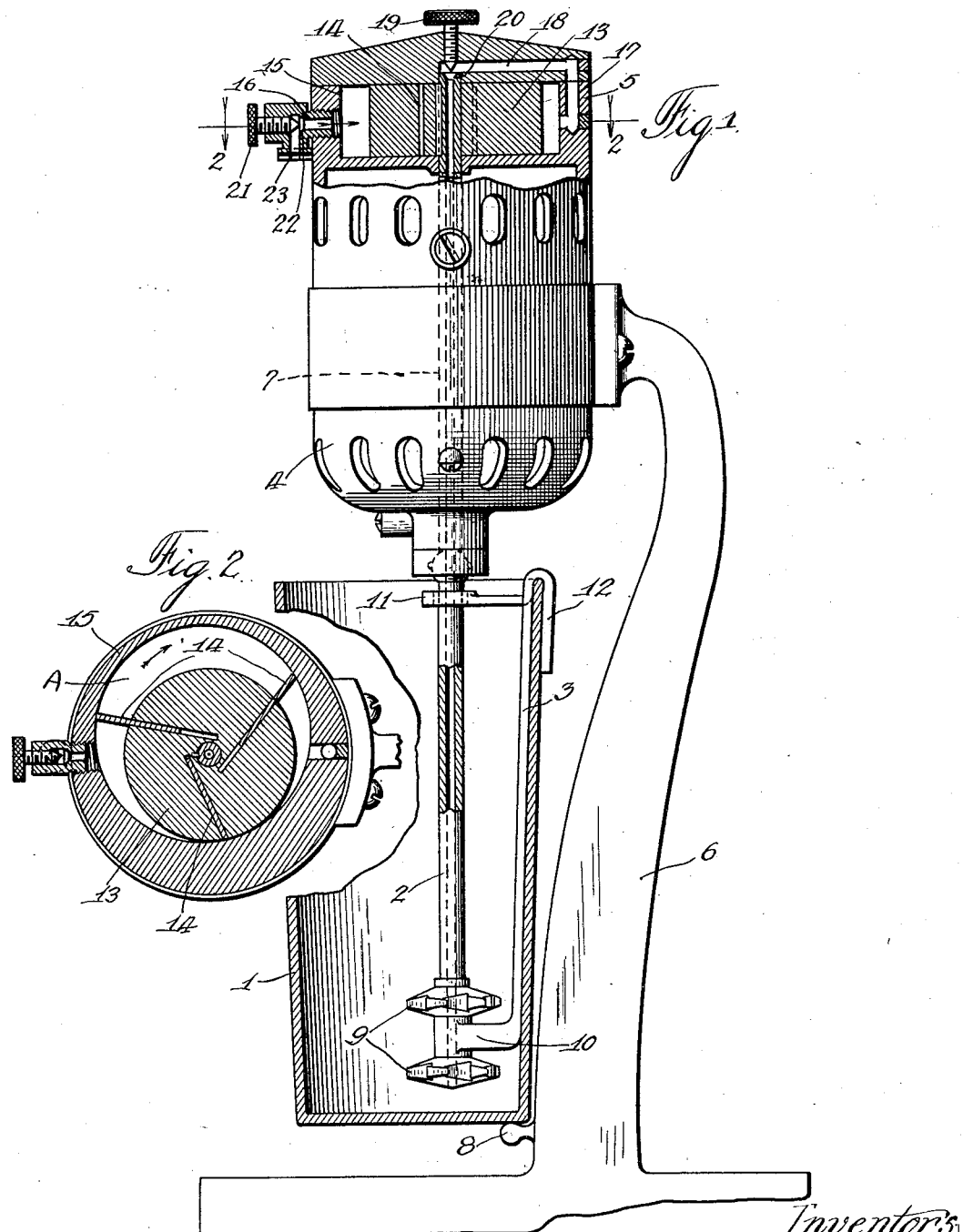

1,819,637

UNITED STATES PATENT OFFICE

HERBERT E. CARLSON AND CLYDE S. MORSE, OF DE KALB, ILLINOIS

DRINK MIXER

Application filed October 9, 1929. Serial No. 398,422.

Our invention relates to improvements in motor driven drink mixers such as are commonly employed in drug stores and elsewhere in the dispensing of malted milk and other similar drinks.

One of the objects of our invention is to provide such a mixer, having means for positively introducing air into the mixture as it is being stirred or mixed by the device, whereby a thoroughly aerated beverage is obtained, a more palatable and wholesome drink is secured, less of the ingredients, such for example as the malted milk is required, and the time of both the customer and dispenser, in waiting for the drink to be mixed, is reduced.

A further object is to provide aerating means of a type which can be readily applied to mixers now in use.

Further objects will appear from the description and claims.

In the drawings in which three forms of our invention are shown—

Figure 1 is a vertical elevational view showing a motor-driven drink mixer embodying our invention, parts being broken away;

Fig. 2 is a section on the line 2—2 of Fig. 1.

Referring to the drawings in detail and first to Figs. 1 and 2, the construction shown therein comprises a receptacle 1 for the drink to be mixed, a rotary tubular mixing element 2 located substantially in the receptacle 1, a bearing bracket 3 for supporting the rotary mixing element and securing it to the receptacle 1, an electric motor 4 for driving the rotary mixing element 2, an air pump or blower 5 mounted above the electric motor 4, for supplying air through the tubular mixing element to a point adjacent the bottom of the receptacle, and a bracket or stand 6 on which the motor and blower are mounted.

The motor, receptacle, and rotary mixing elements are in a general way similar to a type now in use, in that the rotary mixing element 2 is mounted on and carried by the receptacle 1 and connected and disconnected with respect to the driving shaft 7 of the motor simply by moving the receptacle carrying the mixing element toward or away from the motor. For this purpose the upper end of the rotary mixing element is provided with a clutch element readily engageable and disengageable with respect to the cooperating clutch element on the lower end of the motor shaft 7. Furthermore, the arrangement is such that the mere placing of the receptacle in operative relation with respect to the motor automatically closes a circuit which starts the motor in operation to cause rotary motion of the mixing element. The details of construction by which the above elements are accomplished are well known in this art and need not be further described. The accurate positioning of the receptacle with respect to the motor is accomplished by providing the motor support with a positioning element or rest 8 which is engaged by the bottom of the receptacle 1 when the latter is in operative position, thus accurately positioning the receptacle and mixing element with respect to the motor. The two mixing wheels 9 at the lower end of the mixing element and the supporting bearing bracket are also of a well known type, the bracket 3 having a lower bearing member 10 positioned between the mixing wheels and an upper bearing or positioning member 11 surrounding the upper end of the shaft 2 of the mixing element for steadying it and positioning it. The bracket 3 has a clip portion 12 at its upper end which straddles the upper edge of the receptacle.

Air is supplied from the air pump or blower 5 downwardly through the tubular motor shaft 7 and thence downwardly through the tubular shaft 2 of the mixing element to a point adjacent the bottom of the receptacle. The air pump or blower comprises a cylindrical vane carrying member 13 secured to the upper end of the tubular motor shaft 7 and a plurality of vanes 14 slidably mounted in slots in the cylindrical member 13, these vanes being urged outwardly by centrifugal force and having their outer edges cooperating with the wall of a circular recess 15 eccentric with respect to the member 13 whereby a crescent-shaped chamber is provided through which air is forced by the vanes 14 from the inlet passage 16 to the outlet passage 17 as the member 13 rotates in the direction indicated by the A in Fig. 2. The air flow from the crescent-shaped chamber to the tubular motor shaft 7 is through the L-shaped passage 17 in the wall of the blower housing and thence through the passage 18 in the cover of the blower housing to the opening in the upper end of the motor shaft. In order to regulate the flow an adjusting screw 19 may be provided, the end of which exercises a throttling effect in cooperation with the port 20 at the upper end of the motor shaft. We also find it desirable to control the inlet of air and for this purpose we provide an adjusting screw 21 in the inlet fitting which cooperates with the port 22 in the fitting to exert a variable throttling effect. In order to exclude foreign substances from the inlet to the blower, we provide a screen 23 at the entrance to the inlet fitting.

In operation, the liquid ingredients to be mixed are placed in the receptacle 1 and the receptacle is placed in position on the motor stand thus connecting the rotary mixing element 2 with the drive shaft 7 of the motor and putting the motor in operation. As the motor operates, it causes the rotary mixing elements 9 to agitate the liquids to be mixed and at the same time the rotary blower 5 causes air to be drawn in through the inlet fitting and forced from the outlet through the passages 17 and 18 and down through the tubular motor shaft 7 and tubular mixing element 2 to a point adjacent the bottom of the receptacle, thus causing the air supply to be thoroughly distributed throughout the mass of the liquids to be mixed.

It will be appreciated that this construction provides for a positive introduction of air into the mixture as it is being agitated thereby ensuring a thorough aeration, and that this aeration of the mixture increases the volume of the mixture substantially whereby less of the liquid ingredients are required, and that the introduction of the air shortens the time required for a thorough mixing of the liquids thereby enabling customers to be served rapidly.

While we have illustrated and described our invention in connection with a drink mixer such as may be used in a soda fountain or the like, it is obvious that it is also adapted for other similar uses, such as for use with an egg beater or the like in which the beating of the egg would result in its being thoroughly aerated. In the claims where the word "fluid" is used, it will be understood as contemplating materials which are sufficiently fluid to be mixed by agitation.

We claim:

1. The combination with rotary fluid mixing means, of air impelling means for supplying air to the fluid as it is being mixed, said fluid mixing means comprising an electric motor mounted with its shaft in a vertical position, said shaft being tubular to provide an air passage therethrough, and a mixing chamber comprising a vertical tubular shaft having provisions for ready attachment and detachment with respect to the tubular motor shaft, whereby air forced through the motor shaft will also be forced through the mixer shaft, said motor shaft extending above said motor, and a rotary air pump comprising a rotary air impeller mounted on said upward shaft extension for forcing air through said motor shaft and mixer shaft into the fluid.

2. The combination with rotary fluid mixing means, of air impelling means for supplying air to the fluid as it is being mixed, said fluid mixing means comprising an electric motor mounted with its shaft in a vertical position, said shaft being tubular to provide an air passage therethrough, and a mixing chamber comprising a vertical tubular shaft having provisions for ready attachment and detachment with respect to the tubular motor shaft, whereby air forced through the motor shaft will also be forced through the mixer shaft, said motor shaft extending above said motor, a rotary air pump comprising a rotary air impeller mounted on said upward shaft extension for forcing air through said motor shaft and mixer shaft into the fluid, and an adjustable means for varying the capacity of the inlet to the air pump to control the supply of air to the fluid.

3. The combination with rotary fluid mixing means, of air impelling means for supplying air to the fluid as it is being mixed, said fluid mixing means comprising an electric motor mounted with its shaft in a vertical position, said shaft being tubular to provide an air passage therethrough, and a mixing chamber comprising a vertical tubular shaft having provisions for ready attachment and detachment with respect to the tubular motor shaft, whereby air forced through the motor shaft will also be forced through the mixer shaft, said motor shaft extending above said motor, and a rotary air pump comprising a rotary air impeller mounted on said upward shaft extension for forcing air through said motor shaft and mixer shaft into the fluid, said rotary air pump being provided with a passage for the air from the impeller to the tubular shaft above the impeller.

In witness whereof, we have hereunto subscribed our names.

HERBERT E. CARLSON.
CLYDE S. MORSE.